United States Patent [19]

Hjelsand

[11] Patent Number: 4,474,382

[45] Date of Patent: Oct. 2, 1984

[54] UNITIZED SEAL CARRIER ASSEMBLY FOR RECIPROCATING SHAFT

[75] Inventor: Timothy A. Hjelsand, Duncan, Okla.

[73] Assignee: Halliburton Company, Duncan, Okla.

[21] Appl. No.: 581,931

[22] Filed: Feb. 21, 1984

[51] Int. Cl.³ .............................................. F16J 15/18
[52] U.S. Cl. .................................. 277/237 R; 277/59; 277/72 R; 277/79; 277/123; 277/173; 277/207 R
[58] Field of Search ....................... 277/12, 32, 59, 70, 277/71, 72 R, 72 FM, 79, 123–125, 173, 177, 207 R, 207 A, 237

[56] References Cited

U.S. PATENT DOCUMENTS

| | | | |
|---|---|---|---|
| 2,473,284 | 6/1949 | Knaggs | 277/207 X |
| 3,218,085 | 11/1965 | Grace | 277/59 |
| 4,106,779 | 8/1978 | Zabcik | 277/59 X |
| 4,300,776 | 11/1981 | Taubenmann | 277/124 |
| 4,345,739 | 8/1982 | Wheatley | 277/207 R X |
| 4,352,499 | 10/1982 | Foster | 277/59 |
| 4,440,404 | 4/1984 | Roach et al. | 277/124 |

FOREIGN PATENT DOCUMENTS 1207959 10/1970 United Kingdom .......... 277/207 A

Primary Examiner—Robert S. Ward
Attorney, Agent, or Firm—Thomas R. Weaver; James R. Duzan

[57] ABSTRACT

An improved seal carrier assembly for use in the fluid end of a reciprocating pump.

3 Claims, 2 Drawing Figures

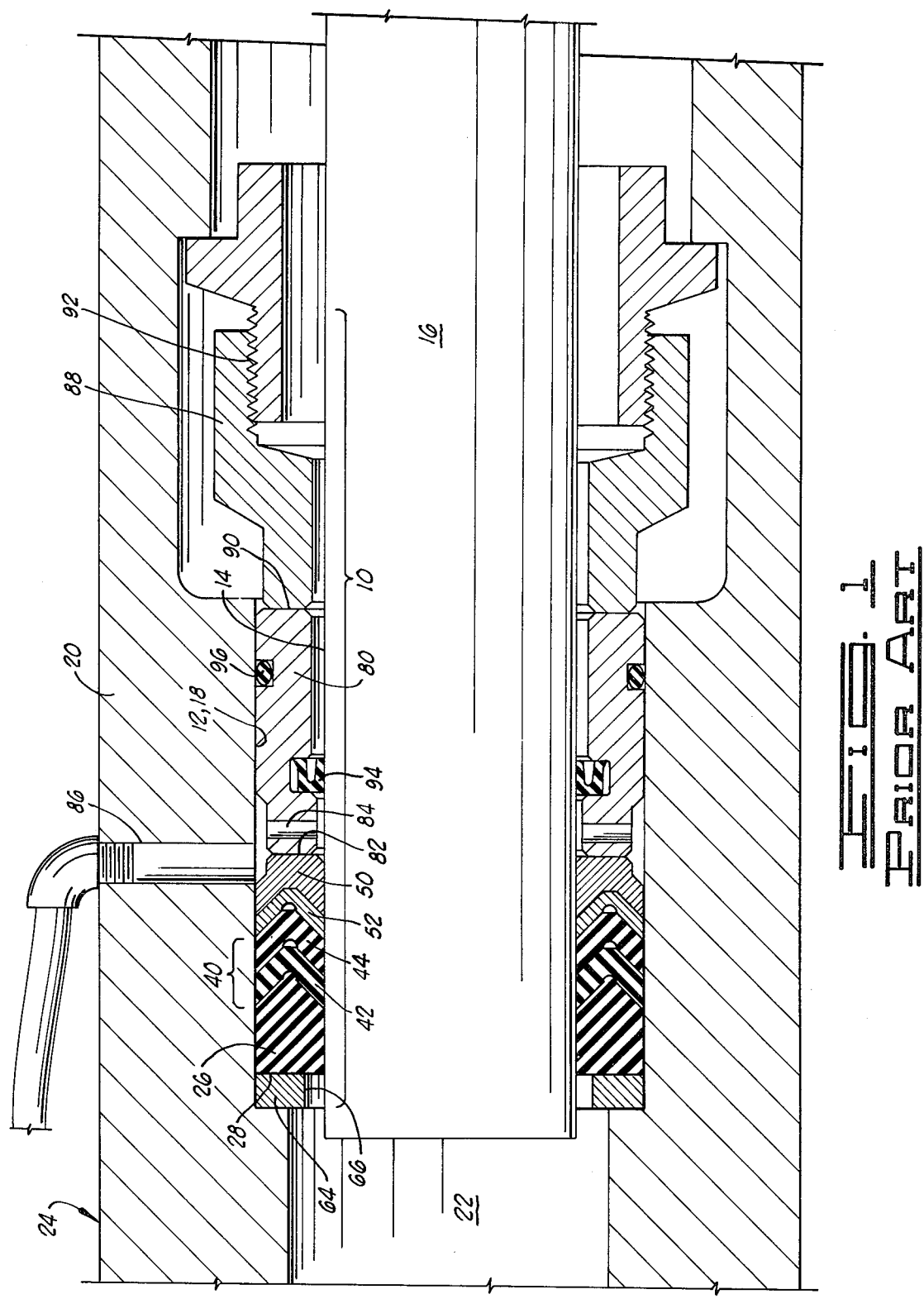

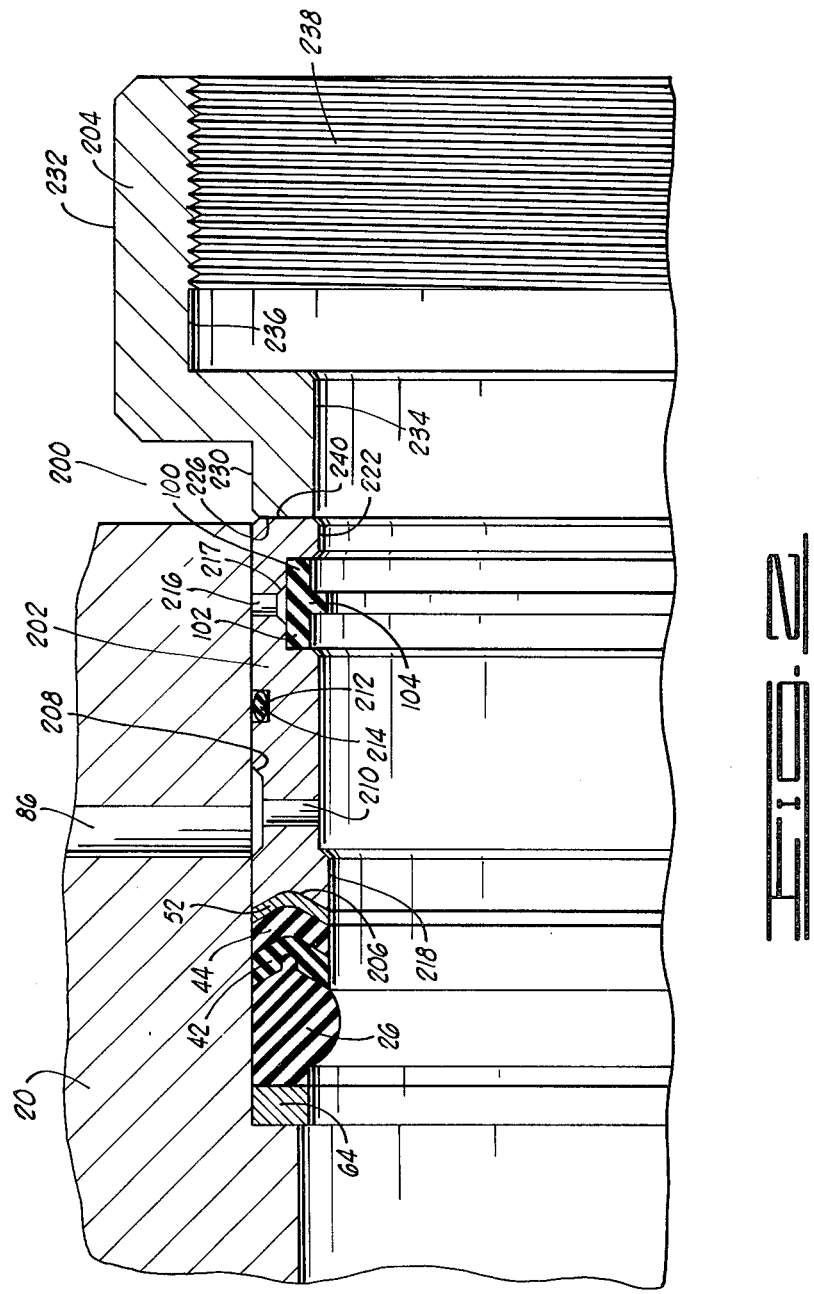

UNITIZED SEAL CARRIER ASSEMBLY FOR RECIPROCATING SHAFT

BACKGROUND OF THE INVENTION

The present invention relates to an improved seal carrier assembly designed for use in sealing the high pressure fluid ends of a reciprocating plunger pump utilized for pumping cement slurries, fracturing slurries, acids and the like for the completion and stimulation of wells in the oil and gas industry.

During the completion and/or stimulation of an oil or gas well, fluids such as cement slurries, fracturing slurries, acids and the like are pumped under pressure into the well. Very high pressures on the order of many thousands of pounds per square inch are typically involved in these pumping operations. Additionally, the fluids are often very abrasive because they carry large quantities of solid particles therein.

This pumping operation is typically achieved by large positive displacement reciprocating plunger-type pumps.

A very difficult sealing problem is encountered at the high pressure fluid end of these pumps, where the abrasive fluid must be prevented from leaking between the reciprocating plunger and the cylinder within which it reciprocates.

Typically, the seal between the reciprocating plunger and the cylinder comprises a packing arrangement including a plurality of V-shaped packing rings constructed of cloth and binder, with various male and female adapters at the forward and rearward ends of those packing sets. A longitudinal compressing is applied to the packing set by an adjusting ring.

Problems encountered in the use of such packing include the deterioration of the V-shaped cloth and binder backing rings due to the hydraulic load from the high pressure fluid end of the pump. A second problem typically encountered is extrusion of the V-shaped cloth and binder packing rings between the small annular clearances present between a female adapter supporting the rearward end of the packing rings and the pump plunger and pump cylinder.

The prior art has included the use of header rings for providing a primary seal between the plunger and cylinder.

The prior art has also included various anti-extrusion devices for preventing extrusion of the packing rings when subjected to high pressures.

The prior art seal carrier has comprised an annular cylindrical sleeve which is used to compress the prior art seal assembly within the fluid end housing of the reciprocating pump to cause the seal assembly to sealingly engage the plunger of the pump.

STATEMENT OF THE INVENTION

The present invention is directed to an improved unitized seal carrier for use in the fluid end of a reciprocating pump.

The features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a cross-sectional view of a prior art wiper seal and seal carrier.

FIG. 2 is a cross-sectional view of the present invention.

DESCRIPTION OF THE INVENTION

Referring now to the drawings and particularly to FIG. 1, a prior art packing assembly, as illustrated in U.S. patent application Ser. No. 406,546, filed on Aug. 9, 1982 and now U.S. Pat. No. 4,440,404 and assigned to the assignee of the present invention, is shown and generally designated by the numeral 10. The packing assembly 10 is shown in place within an annular space 12 defined between a radially outer surface 14 of a pump plunger 16 and a cylindrical bore 18 of a pump body 20.

The plunger 16 reciprocates within the pump body 20 to pump a fluid located in a high pressure fluid end 22 of the pump 24 through a series of inlet and outlet valves (not shown) in a manner which is generally known to those skilled in the art. The pump 24 can be any reciprocating plunger pump and particularly may be a reciprocating plunger pump for pumping cement slurries, fracturing slurries, acids and the like for completion and stimulation of an oil or gas well.

The packing assembly 10 includes an elastomeric header ring 26. The header ring 26 is disposed in a high pressure fluid end of the annular space 12 which is the end adjacent the high pressure fluid end 22 of pump 24.

Header ring 26 provides a primary seal of annular space 12 due to radial compression of header ring 26. This primary seal provides a means for ring 26. This primary seal provides a means for preventing migration of fluid from the high pressure fluid end 22 of pump 24 through the annular space 12.

The header ring 26 is preferably constructed of a homogeneous elastomeric material. By the term "homogeneous" it is meant that the elastomeric material from which the header ring 26 is constructed does not include any non-homogeneous materials, such as layers of cloth or other reinforcing type materials therein. Non-homogeneous elastomeric materials could, however, be used for the header ring 26. Also, a reinforcing fabric (not shown) may be used on the rearward surfaces of header ring 26.

Preferably, the header ring 26 is constructed from nitrile butadiene rubber having a hardness of seventy to eighty (70-80) durometer.

The packing assembly 10 further includes a packing ring 40 disposed in the annular space 10 behind the header ring 26.

Packing ring 40 is shown as including first and second V-shaped packing rings 42 and 44. Packing ring 40 must include at least one V-shaped packing ring, and may include more than two such rings.

The packing rings 42 and 44 are conventional cloth and binder type packing rings.

A female adapter ring 50, preferably constructed from brass, is disposed in the annular space 12 behind the last V-shaped packing ring 44 of packing ring 40.

A V-shaped anti-extrusion ring 52 is disposed in annular space 12 between the last V-shaped packing ring 44 and the female adapter 50.

Anti-extrusion ring 52 provides a means for preventing extrusion of the last V-shaped packing ring 44 between the female adapter 50 and each of the pump plunger 16 and the cylindrical bore 18 of pump body 20.

The V-shaped anti-extrusion ring 52 is so arranged and constructed that it is sufficiently flexible that the inner and outer sealing surfaces thereof are spread apart into sealing engagement with the pump plunger 16 and the cylindrical bore 18 of pump body 20, respectively, when fluid pressure in the high pressure fluid end 22 of pump 24 reaches a first value less than a fluid pressure required to extrude the last V-shaped packing ring 44 between the female adapter 50 and either of said pump plunger 16 or cylindrical bore 18 of pump body 20.

The packing assembly 10 further includes a brass header ring adapter 64, disposed in the annular space 12 ahead of and engaging the forward surface 28 of elastomeric header ring 26. Header ring adapter 64 could also be constructed of other metal or plastic materials.

The header ring adapter 64 provides a means for longitudinally supporting the elastomeric header ring 26 against forward extension thereof when pump plunger 16 reciprocates forward relative to pump body 20.

The V-shaped anti-extrusion ring 52 is so constructed that a permanent set is imparted thereto when the inner and outer sealing surfaces are spread apart due to the forces from high pressures in high pressure fluid end 22 of pump 24.

The packing assembly 10 further includes a seal carrier 80 disposed in the annular space 12 directly behind and engaging a rear end 82 of female adapter ring 50.

The seal carrier 80 has an oil passage 84 disposed therethrough for conducting lubricating oil from a lubricating oil supply line 86 to the pump plunger 16 for lubricating the pump plunger 16 along the area of sealing engagement with the packing assembly 10.

Seal carrier 80 includes inner and outer seals 94 and 96 for sealing against plunger rod 16 and cylindrical bore 18 of pump body 20, respectively.

Packing assembly 10 further includes a packing adjustment ring 88 located behind and directly engaging a rear end 90 of seal carrier 80.

Packing adjustment ring 88 may be adjusted by rotation of the same at threaded connection 92 for advancing packing adjustment ring 88 relative to pump body 20 and for thereby adjusting a longitudinal compression of the remaining components of packing assembly 10.

In the packing assembly 10, a high sealability against leakage of fluid from high pressure end 22 is provided by the radial compression of header ring 26. This is the primary seal against fluid leakage.

Additional sealing against migration of fluid from the high pressure fluid end 22 is provided by the packing rings 42 and 44.

Extrusion of the last packing ring 44 past the female adapter ring 50 is prevented by anti-extrusion ring 52.

The V-shaped rings, such as 42 and 44 and such as the anti-extrusion ring 52, achieve their sealing effect due to being pressure energized or mechanically energized to spread the legs of the V-shaped sealing elements so as to seal the ends of those legs against the pump plunger 16 and the pump body 20. That is as contrasted to the radial compression which achieves the seal on the header ring 26.

The wearing components of the packing assembly 10 include the header ring 26, the packing elements 42 and 44, and the anti-extrusion ring 52.

These wearing components may be replaced when they wear out by disassembling the packing assembly 10 and replacing the header ring 26, the packing elements 42 and 44, and anti-extrusion ring 52 with a new packing set.

The header ring adapter 64, the female adapter ring 50, and seal carrier 80 may be reused and generally do not need to be replaced when the pump 24 is repacked.

Referring to FIG. 2, the improved unitized seal carrier 200 of the present invention is shown.

A wiper seal 100 comprises an annular, circular elastomeric member having a rim portion 102 and inwardly projecting rib portion 104 extending inwardly from the rim portion 102 and located approximately in the center thereof. The rim portion 102 and rib portion 104 forming a seal having a generally T-shaped cross-section.

Although the wiper seal 100 may be formed of any suitable elastomeric materials, a ninety (90) durometer hardness carboxylated nitrile rubber elastomer is preferred.

Also, when using this type of nitrile rubber elastomer, the seal 100 should be loaded when installed in the improved unitized seal carrier 200 to a loading of approximately 300 pounds per square inch plus or minus 100 pounds per square inch of loading ($300 \pm 100$ lbs./in.$^2$) on the contact surface to resist rolling or toroidal twisting within the groove in the improved unitized seal carrier 200. Although the dimensions of the seal 100 may vary, when using the nitrile rubber elastomer for the wiper seal 100, the loading rate of 300 pounds per square inch plus or minus 100 pounds per square inch loading is preferred.

The improved unitized seal carrier 200 comprises an annular, elongated cylindrical member having; on one end thereof, a V-shaped annular recess 206; on the exterior thereof, a first annular recess 208 having, in turn, a plurality of apertures 210 extending therefrom to second bore 220 on the interior of the improved unitized seal carrier 200 to allow fluid communication thereacross from oil passage 86 to the pump plunger (not shown), a second annular recess 212 having, in turn, an elastomeric seal means 214 contained therein, and a plurality of wiper apertures 216 extending from the exterior of the improved unitized seal carrier 200 to the second annular recess 217 located above first annular recess 224 which contains wiper seal 100 therein; on the interior thereof, first cylindrical bore 218, second cylindrical bore 220 having a diameter greater than that of bore 218, and third cylindrical bore 222 having a diameter the same as that of bore 220 and having, in turn, first annular recess 224 therein containing wiper seal 100 therein and second annular recess 217 located within recess 224, and; on the other end thereof, flat end surface 226.

The V-shaped annular recess 206 receives V-shaped anti-extrusion ring 52 therein. The anti-extrusion ring 52 receives packing ring 44 therein while packing ring 44 receives packing ring 42 therein and packing ring 42 receives header ring 26 therein. Header ring 26 abuts header ring adapter 64 while header ring adapter abuts a portion of pump body 20.

The improved unitized seal carrier 200 offers the advantages of axially supporting the V-shaped packing rings 42 and 44 as well as anti-extrusion ring 52, retaining lubricating oil in the lubricating cavities and holes by utilizing two elastomeric seals; i.e., the elastomeric seal 214 and wiper seal 100, and providing an annular recess 217 and a plurality of apertures 216 that allow the elastomeric wiper seal 100 to deform thereinto to allow the zone of contact of the wiper seal with the pump plunger to lift off the pump plunger and vent fluid, if excessive fluid pressure is generated by leakage past the V-shaped seals 42 and 44. This deformation of the wiper seal 100 into the annular recess 217 and apertures 216 occurs at a fluid pressure below that which would cause the seal to extrude between the pump plunger and improved unitized seal carrier 200, yet at a fluid pressure value above fluid pressures normally encountered for lubricating purposes thereby preventing damage to the wiper seal 100.

Having thus described my invention, I claim:

1. An improved unitized seal carrier for use in sealing the high pressure fluid end of a reciprocating plunger pump, wherein:
   the improved unitized seal carrier comprises:
   an annular, elongated cylindrical member having on the interior thereof, a first annular recess and second annular recess located within the first annular recess and, on the exterior thereof, a first annular recess having, in turn, a plurality of apertures extending therefrom to the interior of the cylindrical member and a plurality of apertures extending from the exterior of the cylindrical member to the second annular recess located within the first annular recess located on the interior of the cylindrical member.

2. The seal carrier of claim 1 wherein the improved unitized seal carrier further comprises:
   on the interior thereof,
   a first cylindrical bore;
   a second cylindrical bore having a diameter greater than that of the first cylindrical bore; and
   a third cylindrical bore having a diameter greater than that of the second cylindrical bore, the first annular recess and second annular recess located within the first annular recess being located in the third cylindrical bore; on the exterior thereof,
   a second annular recess formed at a location between the first annular recess and the plurality of apertures extending from the exterior of the cylindrical member to the second annular recess located within the first annular recess located on the interior of the cylindrical member; and,
   on one end thereof,
   a V-shaped annular recess.

3. The seal carrier of claim 2 further comprising:
   an elastomeric seal means located within second annular recess formed in the exterior of the improved unitized seal carrier.

* * * * *

UNITED STATES PATENT AND TRADEMARK OFFICE
CERTIFICATE OF CORRECTION

PATENT NO. : 4,474,382

DATED : October 2, 1984

INVENTOR(S) : Timothy A. Hjelsand

It is certified that error appears in the above-identified patent and that said Letters Patent is hereby corrected as shown below:

In column 2, line 29, delete the sentence [This primary seal provides a means for ring 26.]

Signed and Sealed this

Fifth Day of March 1985

[SEAL]

Attest:

DONALD J. QUIGG

*Attesting Officer*     *Acting Commissioner of Patents and Trademarks*